United States Patent [19]
David et al.

[11] Patent Number: 5,748,346
[45] Date of Patent: May 5, 1998

[54] DEVICE FOR STOWING AWAY A HOLOGRAPHIC MIRROR, NOTABLY FOR AIRCRAFT

[75] Inventors: Jean-François David, Merignac; Jean-Pierre Gerbe, Pessac, both of France

[73] Assignee: Sextant Avionique, Meudon la Foret, France

[21] Appl. No.: 855,787

[22] Filed: May 12, 1997

Related U.S. Application Data

[63] Continuation of Ser. No. 409,719, Mar. 24, 1995, abandoned.

[30] Foreign Application Priority Data

Mar. 25, 1994 [FR] France ................... 94 03549

[51] Int. Cl.$^6$ .............. G02B 5/32; G02B 27/01; G02B 7/182
[52] U.S. Cl. .............. 359/15; 359/13; 359/632; 359/881
[58] Field of Search .............. 359/13, 15, 841, 359/881, 632; 248/480

[56] References Cited

U.S. PATENT DOCUMENTS

| | | |
|---|---|---|
| 3,945,716 | 3/1976 | Kinder . |
| 4,600,271 | 7/1986 | Boyer et al. . |
| 4,664,475 | 5/1987 | Ferrer .................... 359/13 |
| 4,697,879 | 10/1987 | Gerbe . |
| 4,749,256 | 6/1988 | Bell et al. . |
| 5,050,962 | 9/1991 | Monnier et al. . |
| 5,172,222 | 12/1992 | Plantier et al. . |
| 5,204,666 | 4/1993 | Aoki et al. .................... 359/13 |
| 5,243,450 | 9/1993 | Gerbe et al. . |
| 5,260,829 | 11/1993 | Cantaloube et al. . |
| 5,381,267 | 1/1995 | Woody .................... 359/632 |

FOREIGN PATENT DOCUMENTS

| | | |
|---|---|---|
| 0 279 532 | 8/1988 | European Pat. Off. . |
| 87/01090 | 2/1987 | WIPO . |

*Primary Examiner*—Jon W. Henry
*Attorney, Agent, or Firm*—Oblon, Spivak, McClelland, Maier & Neustadt, P.C.

[57] ABSTRACT

A device for putting away a holographic mirror includes at least one curved slideway, a carriage for moving on the slideway from an operational position to a position where the mirror is put away, the carriage being fixedly joined to the mirror, and a holder holding the mirror in a position where it is put away. The device is used for stowing of a holographic mirror in an aircraft.

18 Claims, 6 Drawing Sheets

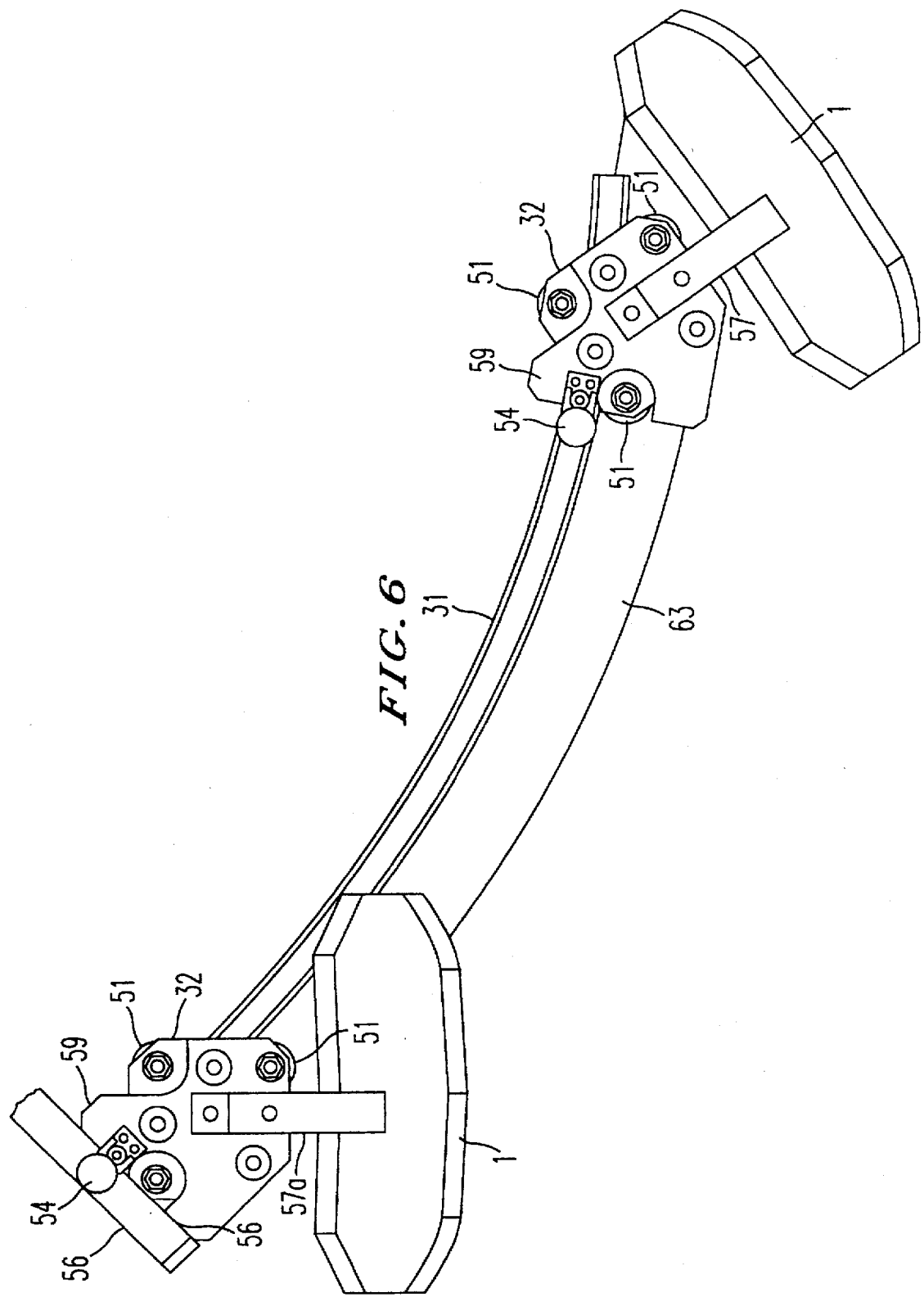

DEVICE FOR STOWING AWAY A HOLOGRAPHIC MIRROR, NOTABLY FOR AIRCRAFT

This application Continuation of application Ser. No. 08/409,719, filed on Mar. 24, 1995, now abandoned.

BACKGROUND OF THE INVENTION

1. Field of the Invention

The present invention relates to a device for stowing away a holographic mirror designed notably to be mounted in aircraft.

2. Discussion of the Background

A mirror such as this forms part of a holographic combiner whose essential role is to present, before the pilot's eyes, light images that are collimated at infinity and superimposed on the external scene. These images are produced in relief through the use of the interference between two laser beams according to the known principle of holography. They come from a projector placed upline from the combiner, the relative position of the projector with respect to a holographic mirror being fixed when the latter is operational.

Combiners of the type referred to above are generally held in position by means of a mechanical device mounted on the ceiling in the aircraft cockpit. They are furthermore mounted in a retractable way for, since the holographic image collimation system is used only during certain stages of flight, the combiner should be capable of being put away for the rest of the time in an area that firstly has the minimum adverse effect on the pilot's external fields of vision and, secondly, prevents impact between the pilot and the combiner.

There are mechanical devices for the holding and positioning of holographic combiners, but these devices do not enable the entire retraction of the combiners, since a part of the mechanism remains in the safety area of the pilot's head once the combiner has been put away. These known devices are formed by two arms positioned on either side of the holographic mirror and are connected to an upper fixed part of the ceiling of the cockpit. In this type of known combiner, the holographic mirror is fixedly joined to the arms that support it. The drawback of this is that they form a very bulky unit entailing penalties as regards putting it away. This has the consequence notably of making it difficult to achieve full retraction. Furthermore, the length resulting from this succession of elements may oblige the pilot to move backwards to permit their passage during the operation of putting the combiner away or during an operational positioning of the combiner. Such movement may prove detrimental to the piloting of the aircraft.

A European patent application No. 0.279.532 presents a system for putting away a holographic mirror, but it is complicated and requires at least two motions to put the holographic mirror away. More specifically it requires a motion of translation of the mirror along a rectilinear axis and a motion of rotation of the mirror about another axis to complete the retraction.

SUMMARY OF THE INVENTION

The aim of the invention is to overcome the above-mentioned drawbacks notably to enable the holographic mirror to be put away to one side of the operator, out of the operator's field of vision by a simple and swift gesture on his or her part without requiring a complicated mechanism for this purpose.

To this end, an object of the invention is a device for putting away a holographic mirror, comprising at least one curved slideway, means for sliding on the slideway from any given position to a given position of being put away, these means being fixedly joined to the holographic mirror, and means to hold the holographic in the position where it is put away.

The main advantages of the invention are that it ensures the operational position of the combiner with high repetitivity of positioning by creating the minimum degree of visual masking, ensures the combiner to be put away to the maximum extent out of the pilot's external field of vision, provides for the frontward retraction of the combiner in the event of impact when the combiner is operational and is economical and simple to implement.

BRIEF DESCRIPTION OF THE DRAWINGS

Other features and advantages of the invention shall appear from the following description, made with reference to the appended drawings of which:

FIGS. 5 and 6 show a possible embodiment of a device according to the invention.

DESCRIPTION OF THE PREFERRED EMBODIMENT

Figure 1:
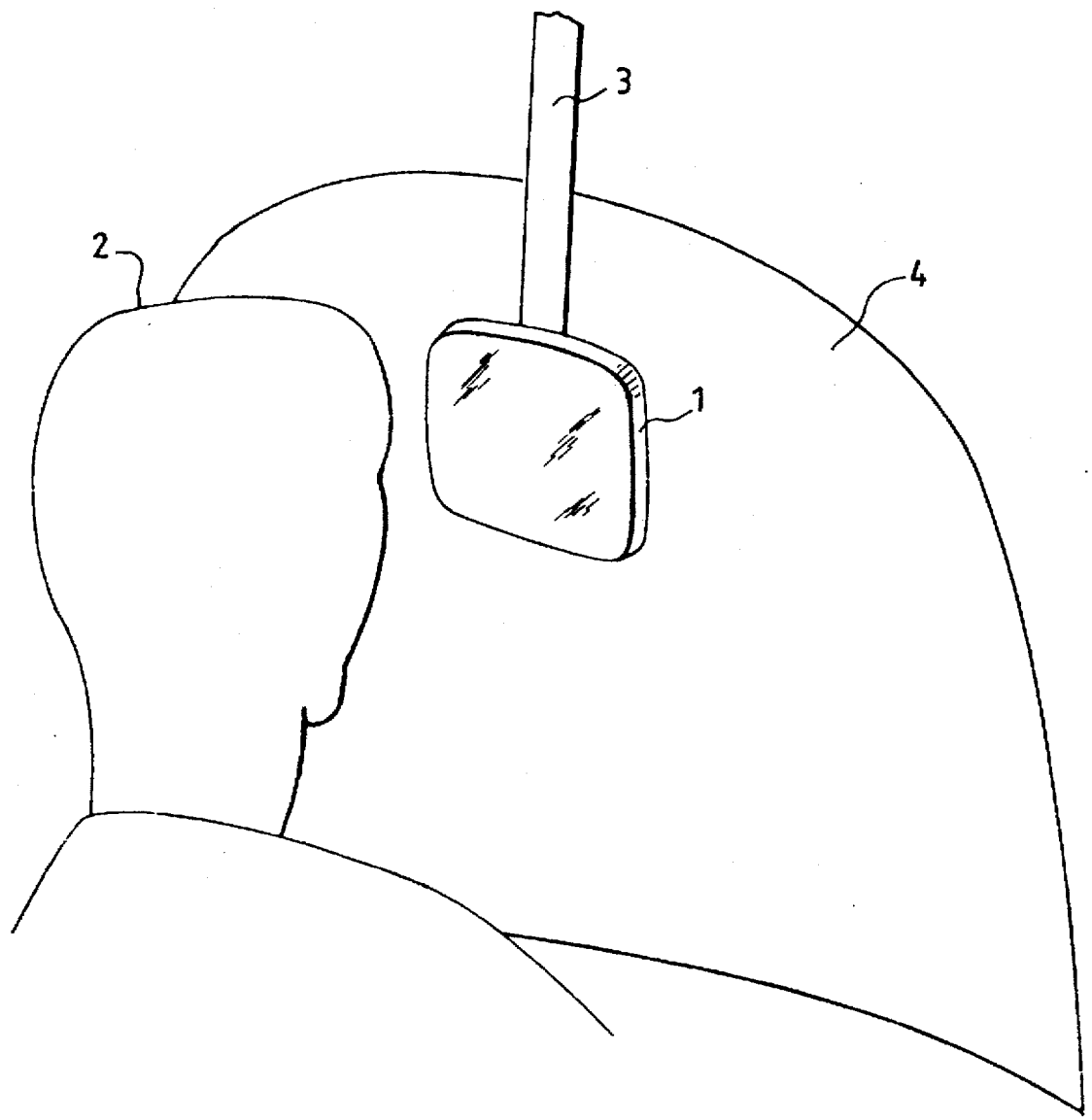
FIG. 1 shows a holographic mirror in operational position.

FIG. 1 shows a holographic mirror 1 in an operational position, located before the eyes of an operator 2, an aircraft pilot for example. The mirror 1, held by partially shown fixing means 3, is then fully in the field of vision 4 of the operator 2. This field of vision 4 is for example the external scene seen from the cockpit of an aircraft. In an operational phase, symbols are recorded for example on the holographic mirror 1 so as to be superimposed on the external scene.

Figure 2:
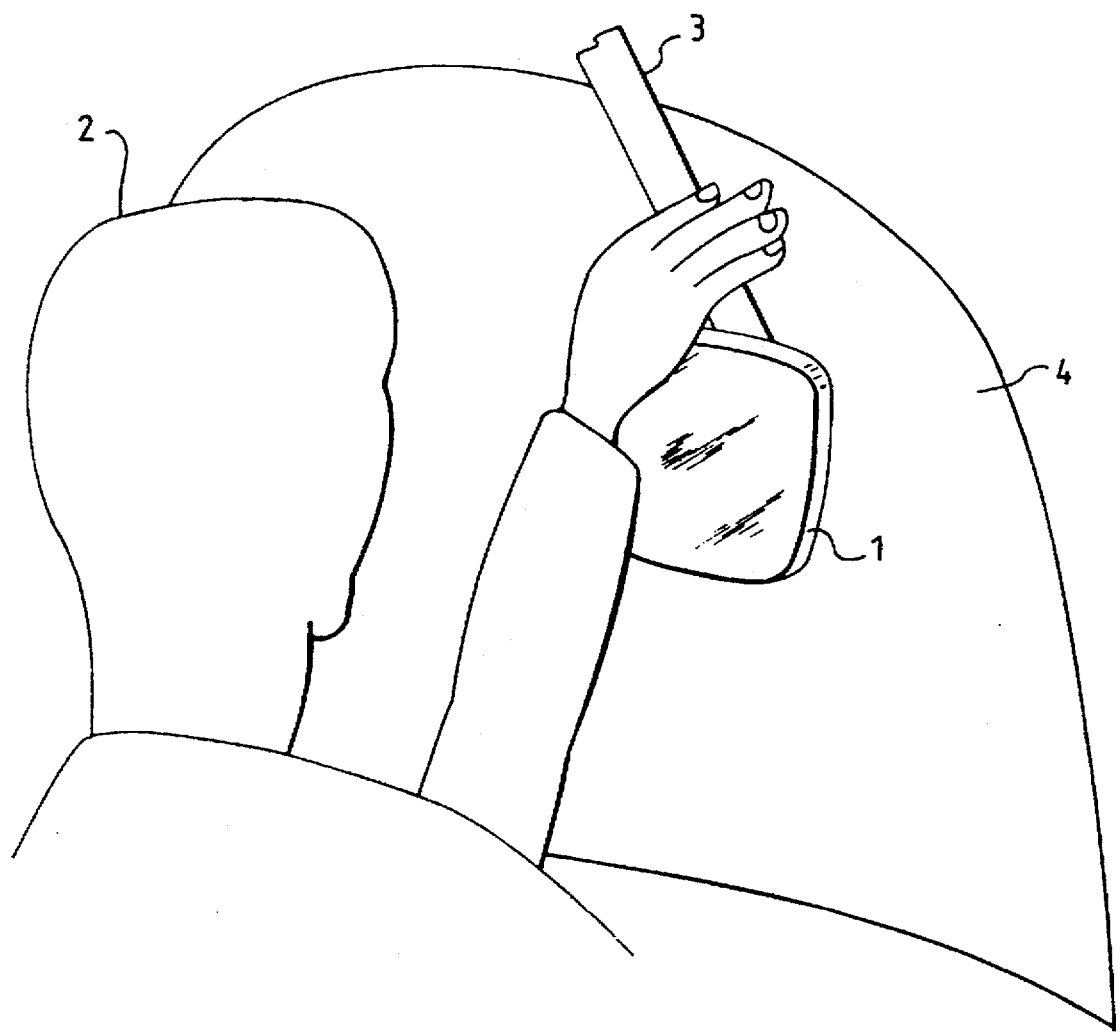
FIG. 2 shows a putting away of a holographic mirror.

When the holographic mirror 1 is no longer in an operational phase, it hampers the operator 2 since it masks his field of vision 4. As can be seen in FIG. 2, the operator 2, the aircraft pilot for example, needs to remove the mirror from his field of vision, if possible by positioning it out of this field of vision and to one side thereof. For reasons of security and comfort in particular, this operation needs to be done as easily and as quickly as possible, especially in the case of a pilot, while providing for the complete clearing of the field of vision.

Figure 3:
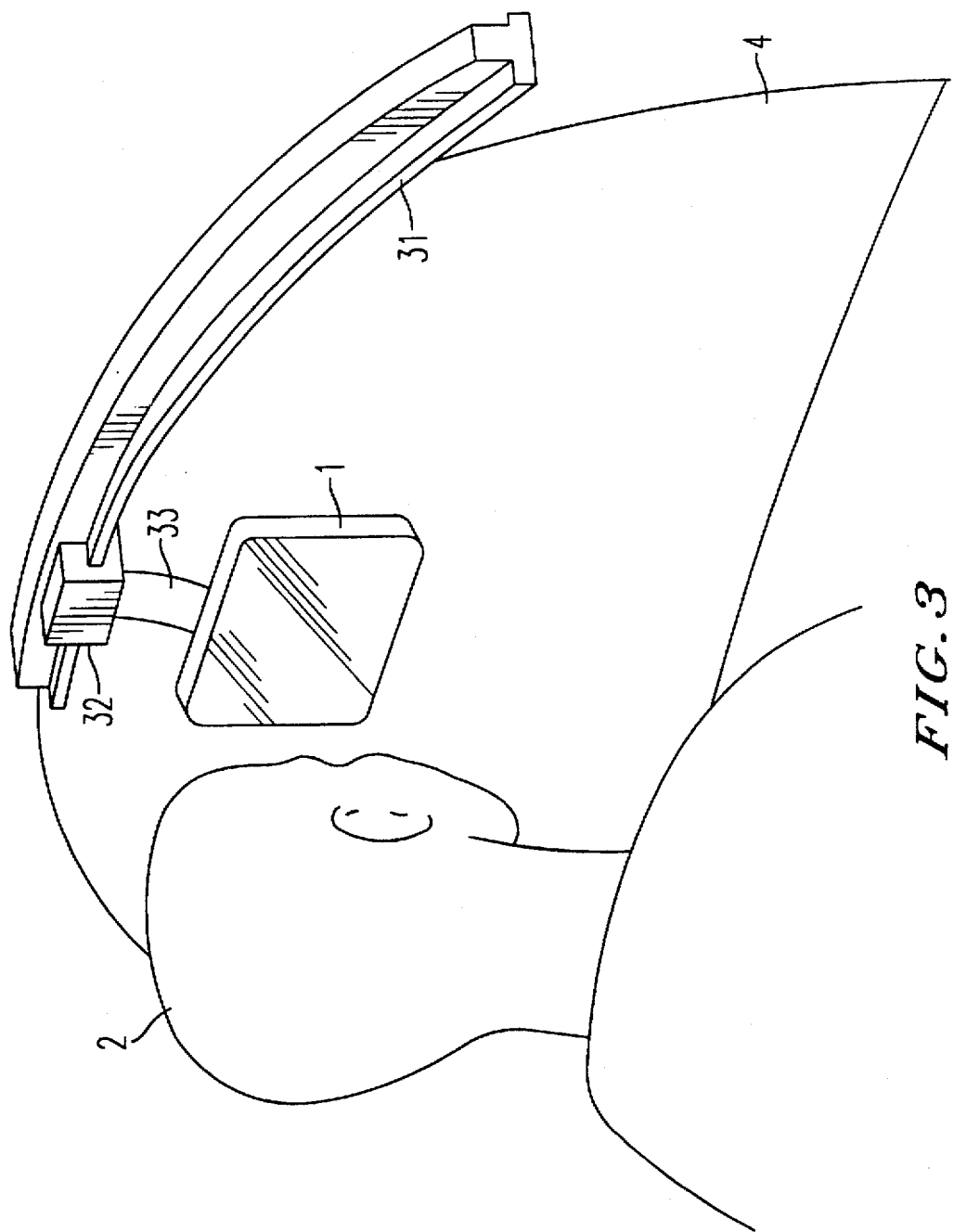
FIGS. 3 and 4 illustrate the principle of the making of a device according to the invention.
Figure 4:
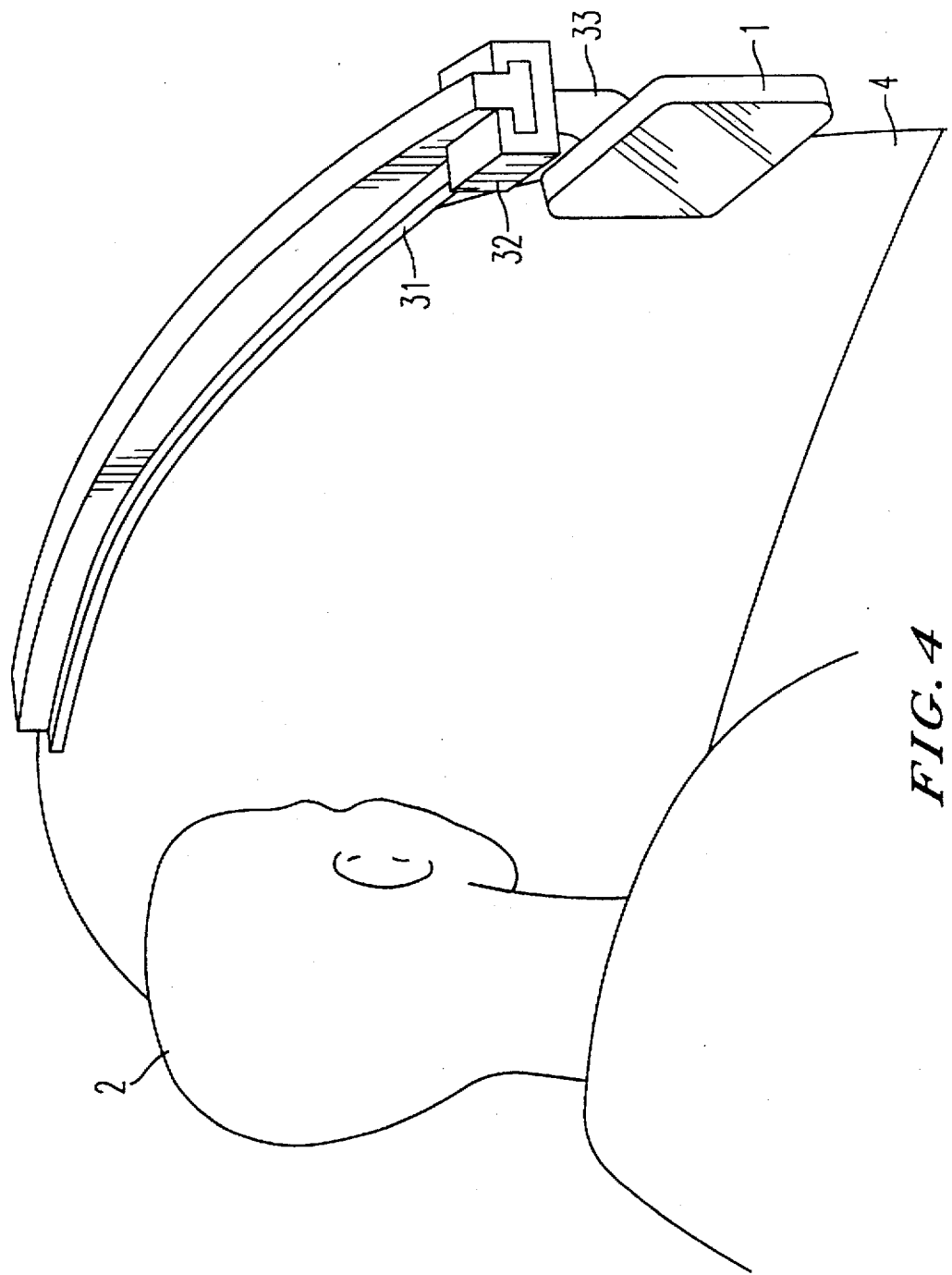

FIGS. 3 and 4 illustrate the principle of the making of a device according to the invention. FIG. 3 illustrates the case where the holographic mirror 1 is in an operational position, hence located for example before the eyes of the operator 2 or at least in his field of vision. The device according to the invention has a curved slideway 31 at least a part of which is located in front of the operator 2 so that a vertical line passing through this part intersects the field of vision of the operator 2. The slideway 31 is, for example, in a part of the space located above the operator. In the case of a holographic mirror used for an aircraft, the slideway 31 is fixed for example on or beneath the windscreen part of the cockpit.

The device according to the invention furthermore has means 32 to slide on the slideway 31. These means 32 are, for example, formed by a moving carriage. They are fixedly joined to the holographic mirror 1, an arm connecting them to this mirror. The slideway 31 is, for example, positioned in such a way that when the carriage and the sliding means 32 are placed at one of its ends, this mirror 1 is before the eyes of the operator 2. Means not shown are designed to hold the mirror 1 in operational position, notably by keeping the carriage 32 still on the slideway 31 by locking these means to the slideway for example.

FIG. 4 shows the device according to the invention with the holographic mirror 1 no longer in an operational position but in a position where it is put away, out of the field of vision 4 of the operator 2. The carriage 32 is, for example, blocked at the end of the slideway 31 so that the holographic mirror 1 remains held out of the field of vision of the operator 2. The fact that the slideway 31 is curved makes it possible notably for the mirror 1 to be put away properly on the side of the operator 2 so that it takes up less space, without the operator exerting a rotational motion on the mirror in addition to the thrust that he exerts to shift it on the slideway 31. In fact, through the curvature of the slideway 31, the guiding of the carriage 32 on the slideway 31 induces a rotational motion of the mirror about an axis going through the axis of symmetry of the mirror. The holographic mirror 1 may thus be put away in the center of an aircraft, beside the pilot, between himself and the copilot for example, its plane possibly being parallel to the plane of symmetry of the aircraft so as to cause the least possible disturbance to the field of vision of the aircraft. The holographic mirror 1 is, for example, rigidly linked to the carriage 32.

The curvature of the slideway is, for example, computed so as to obtain the desired rotation of the mirror 1, this rotation enabling the mirror 1 to be given a position and a direction that takes up as little space as possible.

Figure 5:
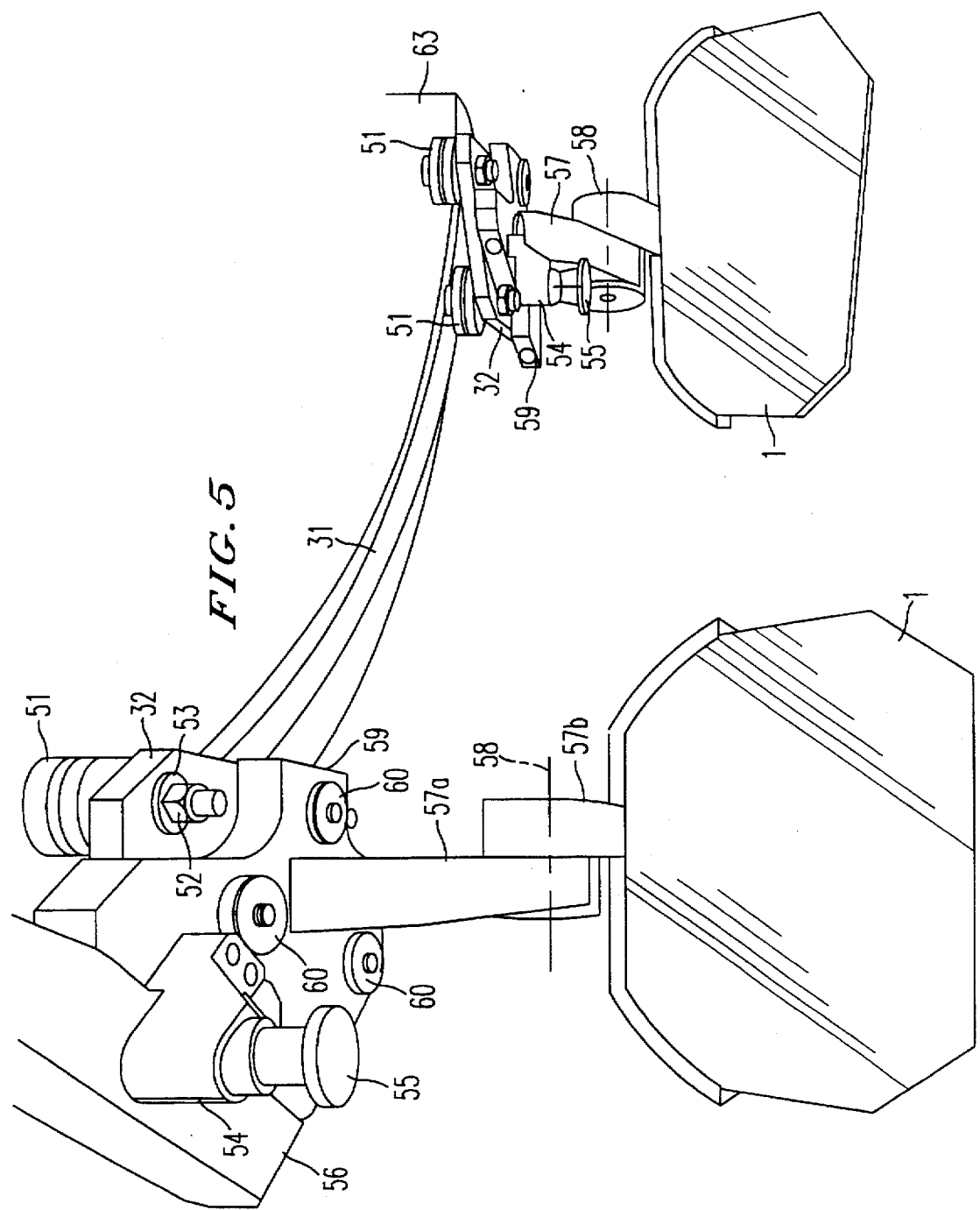

FIGS. 5 and 6 illustrate a possible embodiment of a device according to the invention in an exemplary application to an aircraft, FIG. 5 being a view in perspective of the device and FIG. 6 being a bottom view of the device. In these figures, the holographic mirror 1 is presented both in its operational position on the left-hand part of the figures and in its position where it is put away, on the right-hand part of the figures.

A carriage 32 is guided on a curved slideway 31 by means of rollers 51 rolling along this slideway. The carriage 32 is, for example, suspended on three rollers 51, one roller being placed inside the curvature of the slideway 31 and two rollers 51 being located outside its curvature. A system of nuts 52 and washers 53 can be used for example to fix the carriage 32 to the rollers 51.

A handle 54 is, for example, connected to the carriage 32. This handle 54 enables notably the guiding of the carriage 32 along the slideway 31 for a putting-away operation or for the operational positioning of the holographic mirror 1. The handle 54 is, for example, fitted out with a spring-based pin 55 enabling the locking of the carriage to hold it in a given position of being put away or an operational position notably, then the unlocking of the carriage in the event of a change in its place. To hold the holographic mirror 1 in an operational position, the spring-based pin 55 exerts, for example, a pressure on a fixed element 56 of the aircraft located at the end of the slideway 31.

A linking arm 57a, 57b formed by an upper part 57a connected to the carriage 32 and a lower part 57b continuously connects the upper portion of the holographic mirror 1 to the carriage 32, as shown in FIG. 5. A hinge, schematically represented by its rotation shaft 58, forms the link between the two parts 57a, 57b of the linking arms. A fixed stop, not shown, placed between these two parts 57a, 57b ensures the repeatable nature of the position of the holographic mirror 1 in the operational phase. In the event of an impact between the pilot and the holographic mirror for example, the holographic mirror frontwards is a rotatable, about the shaft 58, of the hinge between the two parts 57a, 57b of the linking arm. The minimum torque needed to prompt the rotation is relatively low so that no harm is done to the pilot.

The handle 54 and the upper part 57a of the linking arm are, for example, not directly connected to the carriage 32 but fixed to a tray 59 which is itself fixed to the carriage 32 by screw systems 60 for example. This tray 59 notably makes it easier to dismantle the device.

The precision of positioning of the device according to the invention for the operational position is, for example, provided by two fixed pins (not shown) and a positioning surface 61 rigidly linked to the structure of the aircraft as well as two bores (not shown) and a positioning surface 62 rigidly fixed to the carriage 32, the pins being designed to be positioned in the bores.

The slideway 31 is, for example, fixed to the mechanical structure of the windscreen 63 or placed beneath the windscreen 63 of the aircraft.

The foregoing exemplary embodiment shows a case where the slideway 31 is an upper part of space, at least above the user's head, the holographic mirror 1 being below the slideway 31. However, it is possible to envisage the placing of the slideway in a lower part of space, the holographic mirror 1 being above the slideway 31.

The shifting of the carriage 32 may be automated, for example, by the use of a motor. A compact electrical motor may then be positioned on the carriage, this motor driving the rotation of the rollers 51 and hence the movement of the carriage on the slideway 31. The motor is, for example, controlled by an electrical starting signal, this signal being given by the pilot. This electrical signal may be transmitted in different ways. It may be transmitted either simply by a simple wire connecting the motor to a control element or by a microwave type wireless link using notably a wave source controlled by the pilot or again by a voice signal given by the pilot, the carriage then containing interfacing circuits known to those skilled in the art that enable the voice signal to be converted into an electrical signal to control the motor. As soon as the desired position of the carriage 32, namely the position in which it is put away or the operational position, is obtained, the motor stops, for example automatically. The mechanical simplicity of the device according to the invention enables not only its simple and swift use by hand, it being possible to unlock the operational position and carry out the putting away and locking operation with a single hand gesture, but also its automatic activation without making use of a complicated system. In any case, the structure of the entire device remains simple and at the same time has remarkable efficiency.

What is claimed is:

1. A device for stowing away a holographic mirror, comprising:

at least one curved slideway located above an operator, sliding means for sliding on the slideway from any position for viewing the mirror to a given position when the mirror is stowed away, said sliding means being fixedly joined to the holographic mirror, and means continuously secured to an upper portion of the mirror for holding the mirror in position when the mirror is stowed away wherein the slideway is fixed to the mechanical structure of a windscreen of an aircraft and wherein said sliding means includes means for moving said mirror along the structure of the windscreen to one side of the field of vision of the operator when the mirror is stowed away and wherein said means continuously secured to the upper portion of the mirror includes a linking arm which continuously interconnects said upper portion of the mirror and said sliding means.

2. A device according to claim 1, wherein the holographic mirror is rigidly linked to the sliding means.

3. A device according to claim 1, wherein the slideway is fixed beneath the windscreen of the aircraft.

4. A device according to claim 1, wherein the sliding means comprises a carriage fixed to a plurality of rollers rolling along the slideway.

5. A device according to claim 4, wherein the carriage comprises a handle having a spring-based pin for locking and unlocking and to hold the carriage in position.

6. A device according to claim 4, wherein the carriage is connected to the holographic mirror by said linking arm, said linking arm including an upper part and a lower part hinged on a shaft, wherein a stop between the upper and lower parts is provided for positioning of the mirror.

7. A device according to claim 6, wherein the mirror is moveable by rotation about the hinging shaft by means of torque applied to the mirror.

8. A device according to claim 1, wherein the mirror is mechanically shiftable from an operational position to a position of being stowed to said one side of the field of vision of the operation.

9. A device according to claim 1, wherein the sliding means comprises a controllable electrical motor.

10. A device for putting away a holographic mirror, comprising:

at least one curved slideway located above an operator;

a sliding mechanism slidable on the slideway from any given position through a position when stowed away, said sliding mechanism being fixedly joined to the mirror; and a mechanism continuously secured to an upper portion of the mirror and holding the mirror in the position where the mirror is stowed away wherein the slideway is fixed to the mechanical structure of a windscreen of an aircraft and wherein said sliding mechanism includes a mechanism moving said mirror along the structure of the windscreen to one side of the field of vision of the operator where the mirror is stowed away and wherein said mechanism continuously secured to said upper portion of the mirror includes a linking arm which continuously interconnects said upper portion of the mirror and said sliding mechanism.

11. A device according to claim 10, wherein the mirror is rigidly linked to the sliding mechanism.

12. A device according to claim 10, wherein the slideway is fixed beneath the windscreen of the aircraft.

13. A device according to claim 10, wherein the sliding mechanism comprises a carriage fixed to a plurality of rollers rolling along the slideway.

14. A device according to claim 13, wherein the carriage comprises a handle having a spring-based pin locking and unlocking the carriage so as to hold the carriage in position.

15. A device according to claim 13, wherein the linking arm comprises an upper part and a lower part hinged on a shaft, wherein a stop between the upper and lower parts is provided for positioning of the mirror.

16. A device according to claim 15, wherein the holographic mirror is movable by rotation about the hinging, shaft by applying torque to the mirror.

17. A device according to claim 10, wherein the holographic mirror is mechanically shiftable from an operational position to a position of being stowed away to one side of the field of vision of the operator.

18. A device according to claim 10, wherein the sliding mechanism comprises a controllable electrical motor.

* * * * *